US012732504B2

(12) United States Patent
Luo et al.

(10) Patent No.: US 12,732,504 B2
(45) Date of Patent: Sep. 8, 2026

(54) AUTOMATIC ACCOUNT MANAGEMENT SYSTEM

(71) Applicant: Global Wisdom Software Technology CO., LTD., Taipei (TW)

(72) Inventors: Jye Luo, Taichung (TW); Chih Hung Lee, Taichung (TW); Chih Shun Chen, New Taipei (TW); Chih Chung Chen, New Taipei (TW)

(73) Assignee: GLOBAL WISDOM SOFTWARE TECHNOLOGY CO., LTD., Taipei (TW)

( * ) Notice: Subject to any disclaimer, the term of this patent is extended or adjusted under 35 U.S.C. 154(b) by 272 days.

(21) Appl. No.: 18/540,204

(22) Filed: Dec. 14, 2023

(65) Prior Publication Data

US 2024/0205230 A1 Jun. 20, 2024

(30) Foreign Application Priority Data

Dec. 16, 2022 (TW) ................................. 111148399

(51) Int. Cl.
*H04L 9/40* (2022.01)

(52) U.S. Cl.
CPC ............ *H04L 63/102* (2013.01); *H04L 63/08* (2013.01)

(58) Field of Classification Search
CPC .............................. H04L 63/102; H04L 63/08
See application file for complete search history.

(56) References Cited

U.S. PATENT DOCUMENTS 6,144,959 A * 11/2000 Anderson ............... G06F 21/31 709/224
7,571,239 B2 * 8/2009 Goringe .................. H04L 63/08 709/229
7,921,201 B2 * 4/2011 Urbanek ............. G06Q 10/063 709/224

(Continued)

OTHER PUBLICATIONS

Baoyi et al., "DRBAC Based Access Control Method in Substation Automation System," 2008, pp. 1-5 (Year: 2008).*

(Continued)

*Primary Examiner* — Luu T Pham
*Assistant Examiner* — Canh Le
(74) *Attorney, Agent, or Firm* — Sinorica International Patent & Trademark

(57) ABSTRACT

An automatic account management system includes a storage unit and a processing unit. The storage unit stores personnel information and device information. The personnel information corresponds to an authorized person and includes their identification name and contact details, while the device information corresponds to a managed device and includes multiple accounts and credentials for login. The processing unit includes a credential modification module, a remote login module, and an account verification module. The credential modification module is adapted to modify one of the credentials through a credential modification algorithm, and the modified credential is then stored in the storage unit and updated to the managed device through the remote login module. The account verification module, referencing the identification name and contact details, contacts the authorized person through an electronic process for verifying validities of these accounts.

9 Claims, 5 Drawing Sheets

(56) References Cited

U.S. PATENT DOCUMENTS

| | | | | |
|---|---|---|---|---|
| 8,572,709 | B2 * | 10/2013 | Hockings | H04L 9/3226 726/19 |
| 8,621,211 | B1 * | 12/2013 | Kishore | H04L 41/12 713/168 |
| 9,203,616 | B1 * | 12/2015 | Brown | H04L 9/085 |
| 11,677,774 | B2 * | 6/2023 | Cooney | H04L 63/1433 726/25 |
| 12,088,615 | B2 * | 9/2024 | Sundaram | H04L 63/0876 |
| 2007/0005738 | A1 * | 1/2007 | Alexion-Tiernan | H04L 41/12 709/223 |
| 2013/0086658 | A1 * | 4/2013 | Kottahachchi | H04L 63/10 726/6 |
| 2018/0107820 | A1 * | 4/2018 | Simakov | G06F 21/50 |

OTHER PUBLICATIONS

Giocomo et al., "A Preliminary Study of Privilege Life Cycle in Software Management Platform Automation Workflows,", 2023, pp. 1-8 (Year: 2023).*

* cited by examiner

AUTOMATIC ACCOUNT MANAGEMENT SYSTEM

BACKGROUND OF THE DISCLOSURE

1. Field of the Disclosure

The present invention relates generally to an automatic account management system, and more particularly to an automatic account management system that operates automatically, which could better express ownership and enhance availability.

2. Description of the Prior Art

Instances of hackers infiltrating a company's internal devices are frequently heard of. In certain cases, hackers may even implant ransomware, leading affected companies to pay substantial ransoms to recover blocked files. Furthermore, if a company's confidential data or customers' personal information gets exposed in this way, it can cause significant trouble and losses for the company. According to foreign research reports, approximately 80% of hacking incidents occur by stealing privileged accounts. Once hackers obtain these privileged accounts, they can freely navigate a company's internal network and act as they please. Therefore, the primary task in preventing such cybersecurity issues is to securely manage accounts.

To address the aforementioned issues, there are currently applications based on the Zero Trust framework. Additionally, the industry is inclined to use a systematic and rigorous approach to manage accounts or credentials. As a result, large enterprises are gradually adopting automatic account management systems to handle related administrative tasks. However, implementing an automated account management system can result in a significant workload and lead to usability issues. For small and medium-sized enterprises with limited resources, they may be hesitant to invest in this, and this is the fundamental reason why automatic account management systems cannot be widely adopted.

SUMMARY OF THE DISCLOSURE

In light of the above reasons, the present invention provides an automatic account management system that operates with automation, has low implementation costs, and offers excellent usability.

The present invention provides an automatic account management system applied in a network environment, wherein the network environment includes a plurality of devices, and the devices comprise a managed device; the managed device is adapted to be logged in using multiple accounts, each of which is accompanied by a credential for logging into the managed device; among these accounts, there is a privileged account that, when used to log in to the managed device, allows one to edit, create, or delete accounts and their respective credentials; the managed device is configured to be logged into by an authorized individual. The automatic account management system includes a storage unit and a processing unit, wherein the storage unit stores a personnel information and a device information, wherein the personnel information corresponds to the authorized person, and includes an identification name and contact details of the authorized person; the device information corresponds to the managed device, and includes the accounts and the credentials which are capable of logging in the managed device; the storage unit also stores an authorization relationship between the authorized person and the managed device. The processing unit is linked to the storage unit in an information-exchangeable manner, wherein the processing unit includes a credential modification module, a remote login module, and an account verification module, wherein the credential modification module is adapted to use a credential modification algorithm to modify at least one of the credentials in the device information stored in the storage unit, and to update the at least one of the credentials, which has been modified, to the storage unit. The remote login module is adapted to use the accounts and the credentials contained in the device information stored in the storage unit to log in to the managed device, wherein, after the credential modification module operates, the remote login module uses the privileged account to log in to the managed device for updating the at least one of the credentials which has been modified to the managed device. The account verification module is adapted to, based on the authorization relationship stored in the storage unit and the identification name and the contact details contained in the personnel information, contact the authorized person for verifying validities of the accounts contained in the device information through an electronic process.

In an embodiment, if the account verification module of the processing unit finds out one of the accounts has lost its validity, the processing unit modifies the corresponding one of the credentials by using the credential modification module, and updates the modified one of the credentials to the storage unit; the processing unit also uses the remote login module to log in to the managed device with the privileged account, updating the modified one of the credentials to the managed device.

In an embodiment, if the account verification module of the processing unit finds out one of the accounts has lost its validity, the processing unit deletes or disables the account which has lost its validity and the corresponding one of the credentials from the device information of the storage unit.

In an embodiment, the account which has lost its validity is deleted or disabled by using the remote login module to log in to the managed device with the privileged account.

In an embodiment, the device information stored in the storage unit also includes a basic data of the managed device; the processing unit further includes a device detect module, wherein the devices includes an unmanaged device; the device detect module actively looks for the unmanaged device among the devices in the network environment through a device detecting method; if the device detect module finds the unmanaged device, the processing unit adds another device information into the storage unit, writing the basic data of the unmanaged device into the another device information, and the unmanaged device becomes another managed device.

In an embodiment, the remote login module of the processing unit further refers to an account credential dictionary to try to log in to the devices; if a privileged account which is capable of logging in to the unmanaged device is found, the privileged account and the corresponding one of the credentials are written into the another device information stored in the storage unit.

In an embodiment, the account credential dictionary is created manually, created by referring to the accounts and the credentials in the device information stored in the storage unit, or created by searching or intercepting the managed device.

In an embodiment, the processing unit further includes an account detect module; when the remote login module logs in to the managed device with the privileged account, the account detect module is adapted to detect whether another account has been added into the managed device, or whether one of the accounts has been deleted; if so, the account detect module notifies the account verification module to verify the validities of the accounts contained in the device information.

In an embodiment, the processing unit further includes a modified credential process module; when the credential modification module modifies one of the credentials, the modified credential process module splits the modified one of the credentials to be kept in different locations.

In an embodiment, the network environment further includes another managed device, and the processing unit further includes a modified credential process module; when the credential modification module modifies one of the credentials, the modified credential process module correspondingly updates the modified one of the credentials to the another managed device through the remote login module by following a predetermined triggering rule.

According to the aforementioned design, the automatic account management system provided by the present invention could operate automatically, eliminating the hassle of complex operations. This makes it easy for small and medium-sized enterprises to implement, and the system is flexible in various scenarios, ensuring the availability of credentials after modifications.

The details, features, and benefits of the present invention, as well as other technical contents, will be clearly presented in the detailed description of the embodiments in conjunction with the accompanying drawings.

BRIEF DESCRIPTION OF THE DRAWINGS

The present invention will be best understood by referring to the following detailed description of one illustrative embodiment in conjunction with the accompanying drawings, in which.

DETAILED DESCRIPTION

Figure 1:
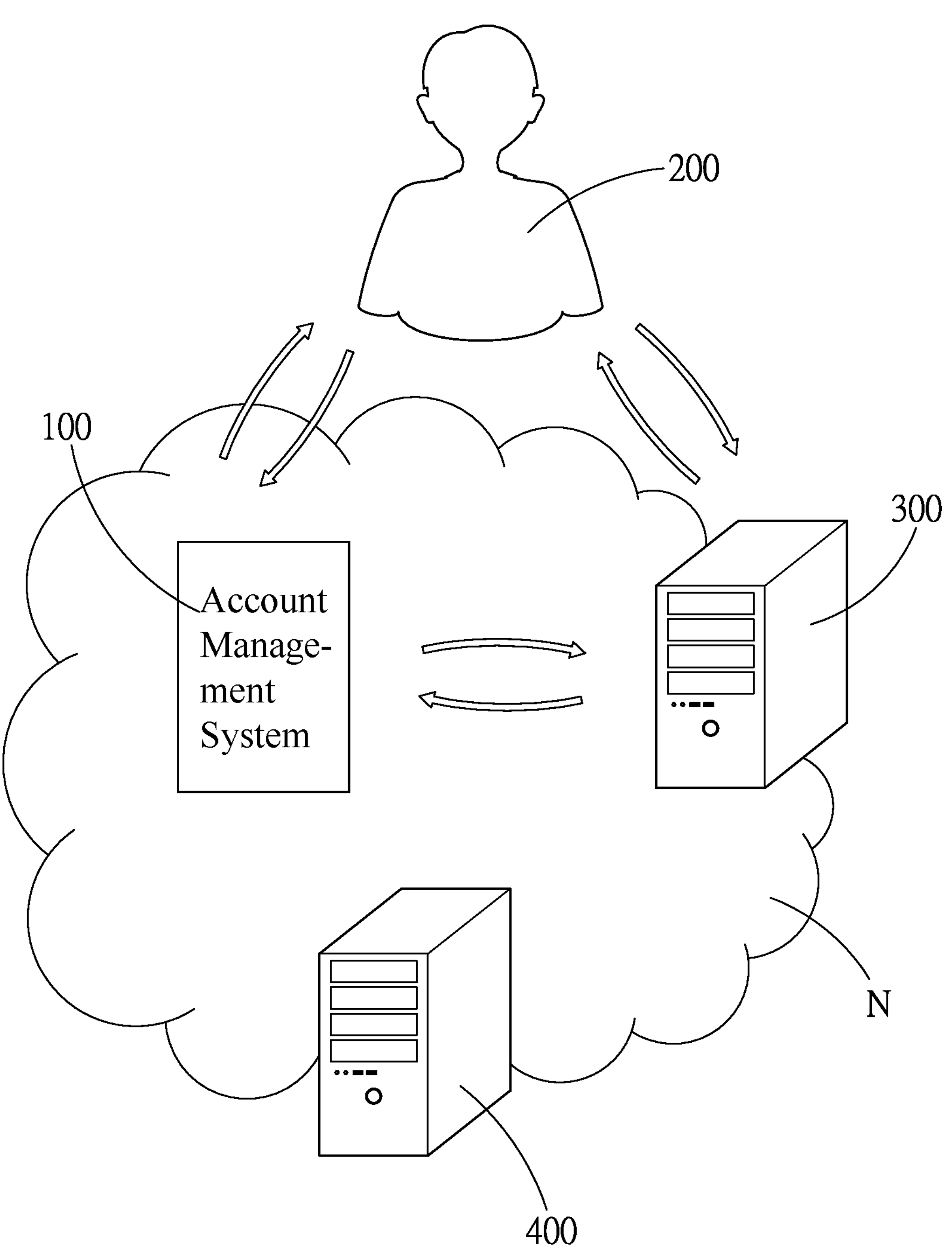
FIG. 1 is a schematic view showing a usage scenario of an automatic account management system of an embodiment of the present invention.

To provide a better understanding for people in this field, the following describes several embodiments of the present invention, along with detailed explanations of the structure and intended benefits of the invention, in conjunction with accompanying drawings. It should be noted that the drawings are simplified schematic representations and, therefore, only show components and their relationships relevant to the invention to provide a clearer description of the basic structure or implementation method of the invention. The actual components and layout may be more complex. Additionally, for the sake of clarity, the components shown in the drawings of the present invention are not drawn with their actual names, compositions, or quantities, and specific names, compositions, and quantities of components can be adjusted according to practical requirements.

Please refer to FIG. 1, which is a schematic view of an automatic account management system 100 of an embodiment of the present invention. As shown in the drawing, the automatic account management system 100 operates in a network environment N such as a corporate Intranet; however, this is not a limitation of the present invention. Generally, the network environment N should include a plurality of devices, wherein the devices could be divided into managed devices 300 and unmanaged devices 400. The managed devices 300 are the devices which are regulated by the automatic account management system 100, such as personal computers of employees, mail servers of the company, network attached storages (NAS), etc. On the other hand, the unmanaged devices 400 are the devices which are not regulated by the automatic account management system 100. For the sake of explanation, there is only one managed device 300 provided in the current embodiment of the present invention. It needs to be understood that, though there is only one managed device 300 mentioned in the descriptions of the present invention, this does not mean that the automatic account management system 100 provided in the present invention can only work with one single managed device in the network environment N; in a real-world scenario, there are of course multiple managed devices, and each of the managed devices interacts with the automatic account management system 100 in the same way as it is for the managed device 300 taken as an example here. Therefore, the present invention won't go into details. Whether it is only one of more than one managed device included in the network environment N or not, it should not be considered beyond the scope of the present invention.

The managed device 300 requires login for use and can be logged in with multiple accounts, each of which corresponds to a specific credential. In other words, these accounts and credentials essentially exhibit a one-to-one pairing relationship. The term 'credential' refers to the information used to verify the identity of the login, including passwords (e.g., alphanumeric combinations, graphics, etc.), biometric data (e.g., fingerprints, iris scans, facial recognition, voice, etc.), or other information capable of identifying the login's identity. Among these accounts, there exists a privilege account, which possesses special privileges. If this privilege account is used to log into the managed device 300, it can modify, add, or delete these accounts and credentials. The managed device 300 is accessed and used by an authorized user 200. Furthermore, although the description of the present invention only mentions a single authorized user 200, it does not imply that the automated account management system 100 provided in the present invention is not suitable for situations with multiple authorized users. Mentioning only a single authorized user 200 here is solely for the sake of explanation.

Figure 2:
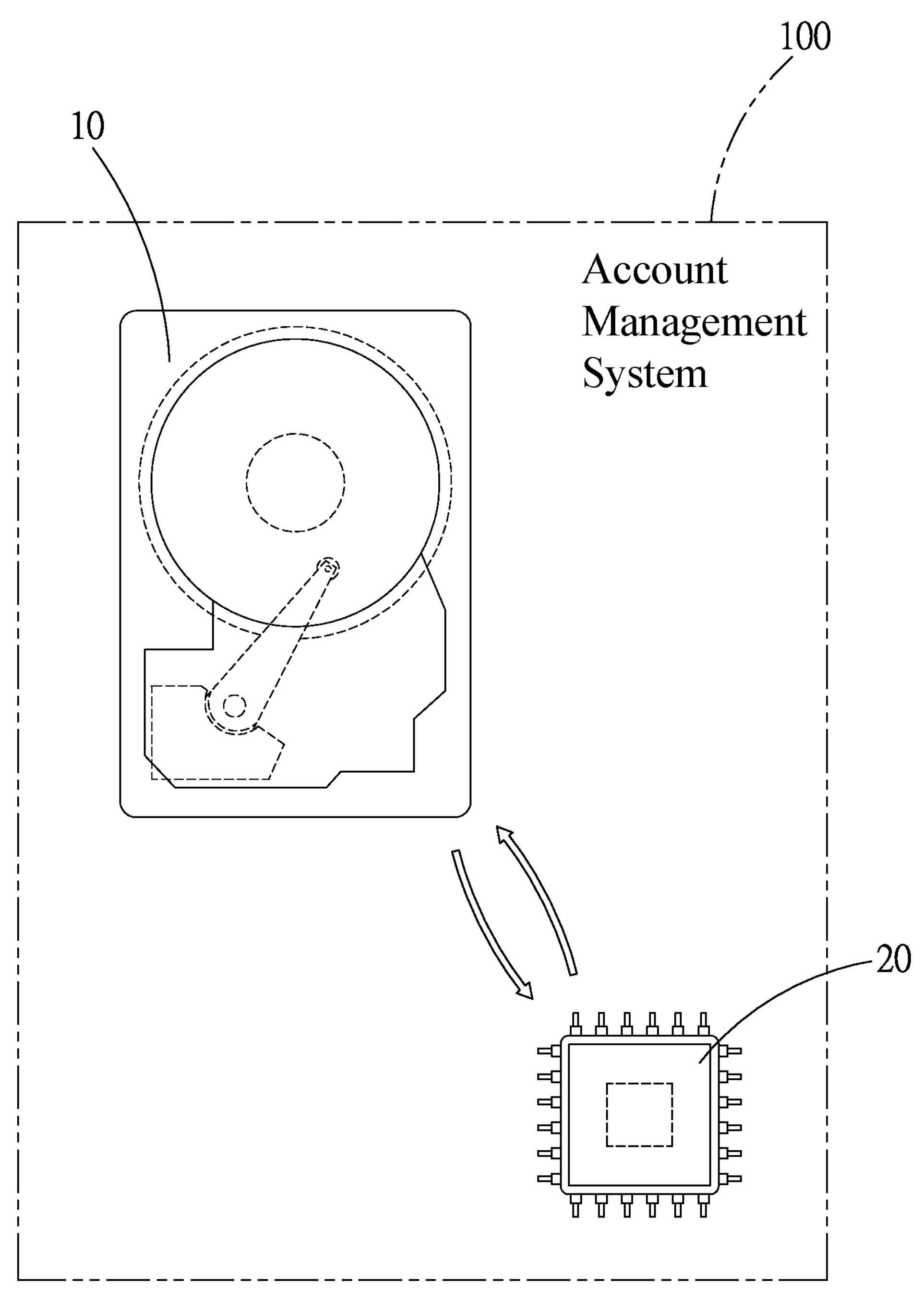
FIG. 2 is a schematic view showing the structure of the automatic account management system of the above embodiment of the present invention.

Next, please refer to FIG. 2. The automatic account management system 100 provided by the present invention includes a storage unit 10 and a processing unit 20. In this embodiment, the storage unit 10 is a hard drive, but this is not a limitation of the present invention. Any hardware device, database software, cloud storage service, or even blockchain capable of storing data should fall within the scope of the present invention. As for the processing unit 20, it does not necessarily have to be an independent processing component. The description here is conceptual and in various embodiments, it can be one or more sets of software, one or more firmware, one or more computers, cloud computing services, or collaborative machines, software, or firmware distributed throughout. As long as it can provide the functionality of the modules described later, it should still be considered within the scope of the present invention.

Figure 3:
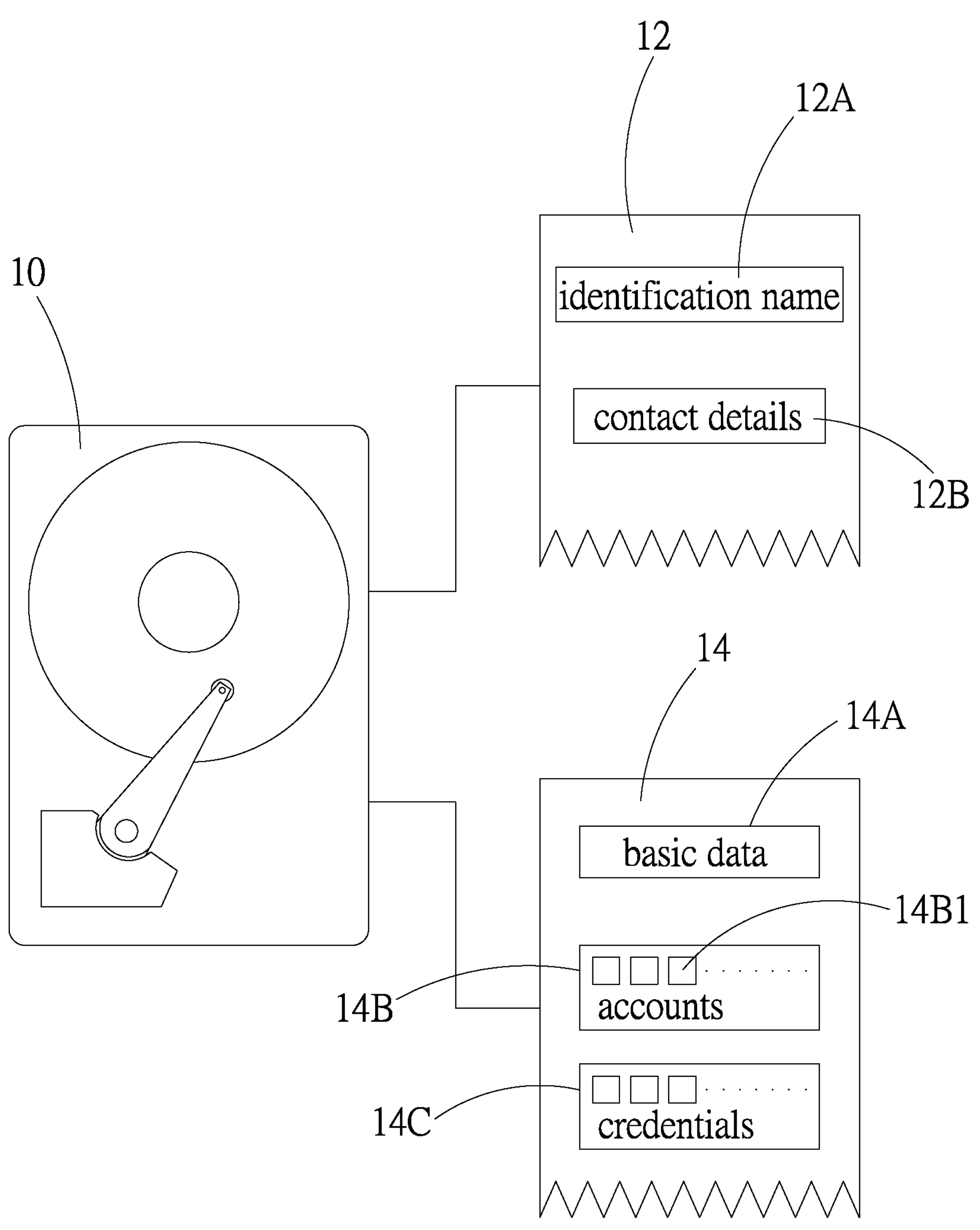
FIG. 3 is a schematic view expressing the data content stored in the storage unit of the automatic account management system of the above embodiment of the present invention.

Regarding the storage content of storage unit 10, please refer to FIG. 3. It is primarily responsible for storing information related to the authorized person 200 and the managed device 300. Specifically, storage unit 10 stores a personnel information 12 and a device information 14, wherein the personnel information 12 corresponds to the authorized person 200, so in scenarios where multiple authorized persons are in use, the number of personnel information entries will also increase accordingly. The device information 14 corresponds to the managed device 300. Similarly, if the network environment N includes multiple managed devices, the number of device information entries will naturally increase. The personnel information 12 includes an identification name 12A and contact details 12B. The identification name 12A can be the name, employee ID, job title, network alias, and so on of the authorized person 200. It is not limited to the examples shown here. The contact details 12B could include email address, phone number, extension number, instant messaging software account, etc., of the authorized person 200, and it is not limited to the examples shown here. As for device information 14, it records a basic data 14A of the managed device 300, as well as multiple accounts 14B and multiple credentials 14C that can be used to log in to the managed device 300. The basic data 14A could include the device type, host name, IP address, communication port, connection protocols, and so on, and is not limited to the examples provided here. The accounts 14B and these credentials 14C have a one-to-one correspondence, and among the accounts 14B, there is a privileged account 14B1. This privileged account 14B1 is used to log in to the managed device 300 and has the authority to modify, add, or delete other accounts and credentials. Furthermore, the storage unit 10 also records an authorization relationship between the authorized person 200 and the managed device 300. Specifically, in the current usage context, which includes multiple authorized persons and multiple managed devices, the authorization relationship specifies which authorized persons can use which managed devices or which authorized persons should log in to which managed devices using which accounts. In other words, since this embodiment is only applied in the context of a single authorized person 200 and a single managed device 300, the explanation of the authorization relationship is relatively simple. However, in cases with multiple authorized persons and managed devices, the explanation of the authorization relationship would correspondingly become more complex, and this should be easily understood by those skilled in the art of this field, so we will not go into further details here.

Figure 4:
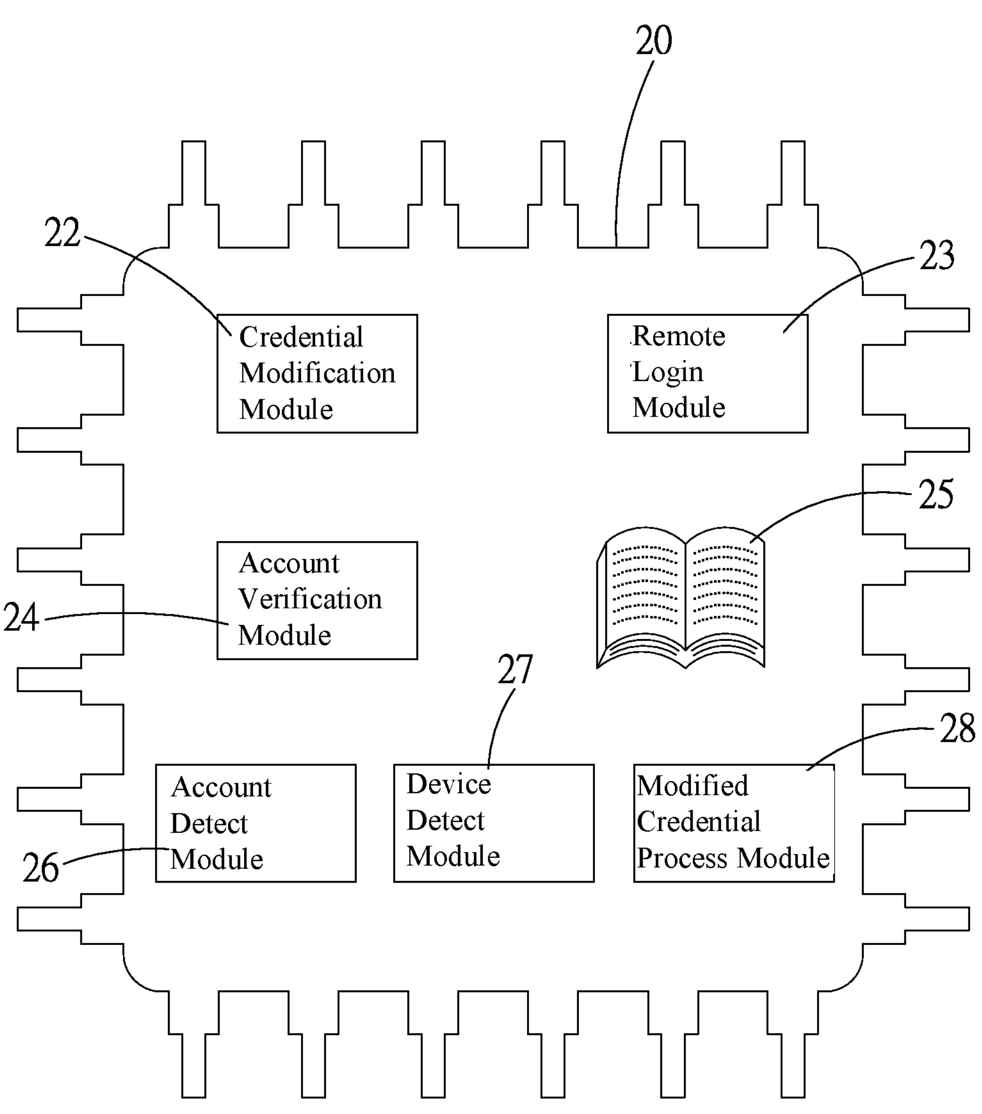
FIG. 4 is a schematic view showing the construction of the processing unit of the automatic account management system of the above embodiment of the present invention.

Regarding the composition of the processing unit 20, please refer to FIG. 4. It includes a credential modification module 22, a remote login module 23, an account verification module 24, an account credential dictionary 25, an account detect module 26, a device detect module 27, and a modified credential process module 28. It should be noted that the various modules described here are not necessarily physical components in practice. The present invention merely logically divides the actions of processing unit 20 and assigns names to these modules for the purpose of explanation. Any implementation method that is functionally equivalent to the descriptions provided for each module later in this document, regardless of the module names and whether they are merged or separated, should still be considered within the scope of the present invention.

Below, we will provide more detailed explanations of each module. As mentioned earlier, the processing unit 20 is linked to the storage unit 10 in an information-exchangeable manner, which means the processing unit 20 could retrieve information from the storage unit 10 and also store or update information in the storage unit 10.

First, the credential modification module 22 is adapted to use a credential modification algorithm to change at least one of the credentials 14C stored in the device information 14. Specifically, when the managed device 300 comes under the regulation of the automatic account management system 100, the credential modification module 22 could immediately modify the credentials 14C, or it could be set to perform this action at specific intervals (e.g., every thirty days) or under certain conditions (e.g., after each login). The specific approach of the credential modification algorithm may involve generating new credentials through randomness or according to specific rules (such as changing the password length, requiring alphanumeric characters, special symbols, etc.). If at least one of the credentials 14C is modified by the credential modification module 22, the modified credential(s) 14C will be updated to the storage unit 10, making it accessible to the authorized person 200 in the future.

Next, the remote login module 23 is designed to use the accounts 14B and the corresponding credentials 14C to log in to the managed device 300. In practice, when the authorized person 200 wishes to log in to use the managed device 300, the authorized person 200 can use the remote login module 23 to automatically retrieve the required account 14B and the corresponding credential 14C for login. It can also display them for manual input by the user or directly populate the retrieved account 14B and the corresponding credential 14C into a connection tool (e.g., PuTTY). After the operation of the aforementioned credential modification module 22, the at least one modified credential 14C not only needs to be updated to the storage unit 10 but also to the managed device 300. At this point, the remote login module 23 would use the privileged account 14B1 and its associated credential 14C or the account 14B and the corresponding unmodified credential 14C to log in to the managed device 300. Using the privileges of the privileged account 14B1 or the account 14B and the corresponding unmodified credential 14C, the modified at least one credential 14C could be effectively updated on the managed device 300. The sequence of implementing the credential modification module 22 could also be performed on the managed device 300 first and then updated to the storage unit 10.

Furthermore, the account detect module 27 is used in conjunction with the remote login module 23. When the remote login module 23 logs into the managed device 300 using the privileged account 14B1, the account detect module 27 could detect whether there are any newly added accounts in the managed device 300 that are not recorded in the device information 14, or whether any accounts 14B have been deleted. If any changes are detected, the account detect module 27 notifies the account verification module 24 to check the situation.

Following the above, the account verification module 24 is adapted to confirm whether the authorized person 200 is indeed the designated user or administrator of the managed device 300 based on the authorization relationship recorded in the storage unit 10. It also contacts the authorized person 200 through an electronic process, referring to the identification name 12A and the contact details 12B contained in the personnel information 12, in order to verify the validities of the accounts 14B included in the device information 14 and to check for any newly added accounts. If it is confirmed that one of the accounts 14B has become invalid, the processing unit 20 basically has two processing methods. The first method is to use the credential modification module 22 to modify the credential 14C paired with the invalid account 14B. Once the modification is complete, the modified credential 14C should be updated to the storage unit 10. It must also be logged into the managed device 300 using the privileged account 14B1 through the remote login module 23 to update the modified credential 14C on the managed device 300. The second method is to simply delete or disable the invalid account 14B and its paired credential 14C from the device information 14 in the storage unit 10. This can be done through the remote login module 23 using the privileged account 14B1 to delete or disable the account 14B on the managed device 300. If new accounts are discovered, the processing unit 20 will use the credential modification module 22 to modify the credential 14C paired with these new accounts. Once the modification is complete, both the new accounts 14B and the modified credentials 14C will be stored in the device information 14 in the storage unit 10.

Furthermore, the device detect module 26 could actively search for unmanaged devices in the network environment N using a device detecting method. Please refer back to FIG. 1. The network environment N also includes an unmanaged device 400, and the device detect module 26 is used to find this unmanaged device 400. Similarly, although this invention only includes a single unmanaged device 400, in practical usage scenarios, there could be multiple unmanaged devices. The arrangement here is simply for the sake of explanation and does not imply that the device detect module 26 of the automatic account management system in this invention cannot be applied in a network environment with multiple unmanaged devices. The device detecting method, in practice, could involve using known tools such as Ping or Sniffer to actively send information to the listening port of the unmanaged device 400 or listen for broadcast packets and messages sent by the unmanaged device 400 to detect the device. If the device detect module 26 locates an unmanaged device 400, the processing unit 20 will add another device information to the storage unit 10 and write the basic data of the discovered unmanaged device 400 into the another device information, making it become another managed device 300.

Furthermore, when it is discovered that the network environment N contains both the unmanaged device 400 and the managed device 300, the remote login module 23 will attempt to log in to the newly discovered unmanaged device 400 and managed device 300. The specific method involves the account credential dictionary 25, which records various account/credential combinations. The remote login module 23 refers to the account credential dictionary 25 and attempts to log in. If it is found that a privileged account can log in to the unmanaged device 400 and the managed device 300, the privileged account and its associated credential are jointly written into the other device information stored in the storage unit 10. The account credential dictionary 25 could be created in various ways. For example, typical devices usually have privileged accounts (e.g., Administrator for Windows server, root for Linux systems, or sa for MS SQL servers). Due to convenience and habit, administrators often use a few sets of credentials. In such cases, the authorized person 200 could manually enter commonly used or habitual account/credential combinations to build the account credential dictionary 25. Alternatively, the authorized person 200 can reference the privileged accounts and their corresponding credentials (historical credentials) manually entered on other devices. Another approach is to search or intercept the login traces of account/credential used on the unmanaged device 400 (such as the hash values of the account and credential used to log in to Windows), which is also a way to build the account credential dictionary 25.

Finally, to ensure the availability of the at least one modified credential 14C after changes, the processing unit 20 includes a modified credential process module 28 to prevent the loss of credentials and ensure their usability. Specifically, the modified credential process module 28 can split the modified credential 14C and keep it in different locations. For example, the splitting could be defined as dividing it into two parts, and the storage can be defined as two different network disk locations or two different email addresses. In practice, encryption may be chosen based on requirements or left unencrypted. When it is necessary to use the modified credential 14C in the future, you can retrieve the split credentials from the previously specified locations and assemble them into a complete credential for use. Additionally, the modified credential process module 28 can also define a triggering rule in advance. Through the action of the remote login module 23, the modified credential process module 28 can synchronously update the modified credential 14C to another managed device. For example, it can be saved in a specific location in a specific file on another managed device. This ensures the availability of the credential after it has been modified.

Figure 5:
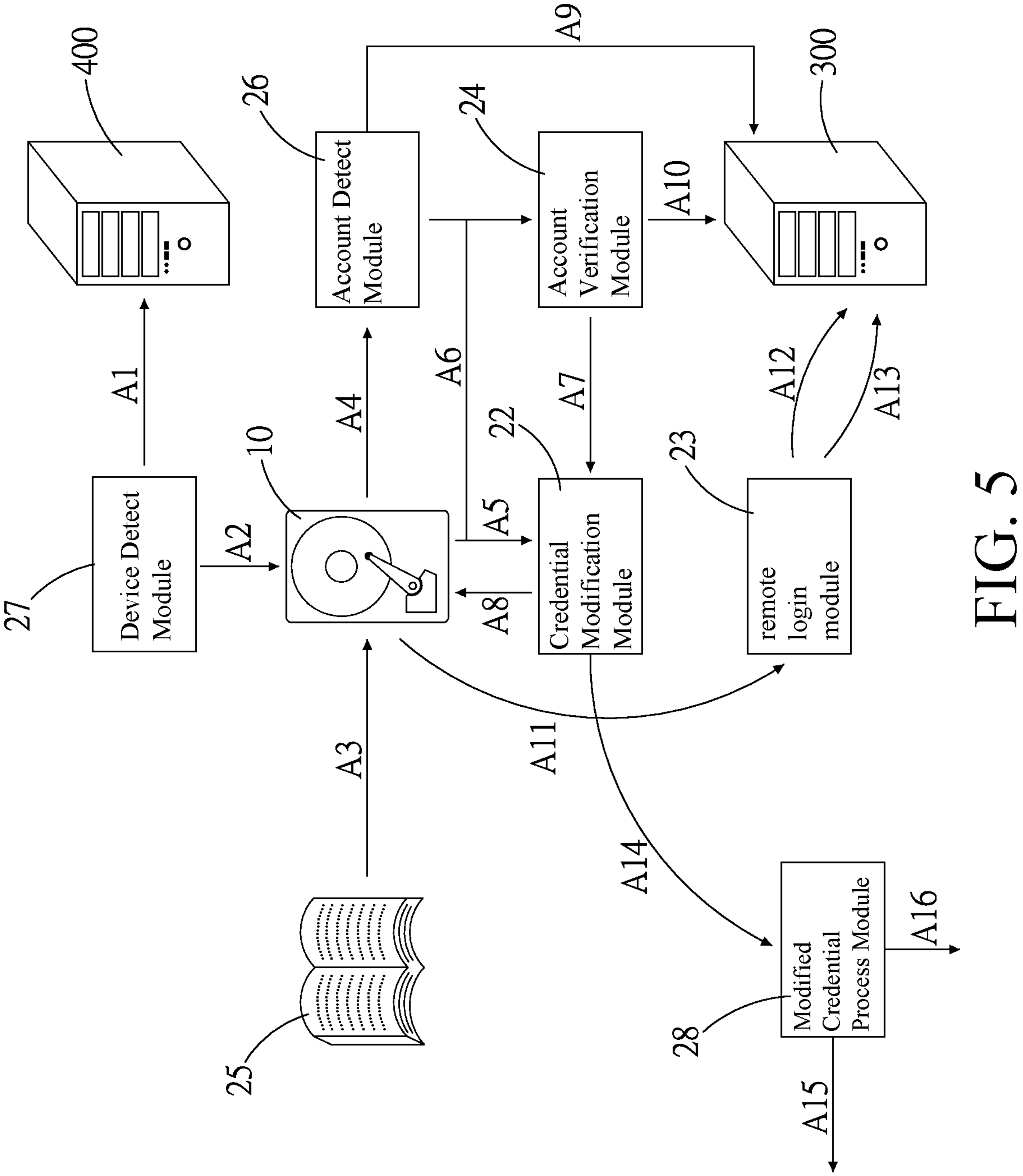
FIG. 5 is a schematic view showing the use of the automatic account management system of the above embodiment of the present invention.

After understanding the functions of the various modules mentioned earlier, please refer to FIG. 5, which presents a conceptual explanation of the processing unit 20, along with the storage unit 10, the managed device 300, and the unmanaged device 400. It's important to note that the following explanation does not imply any specific order of operation for the modules and does not represent fixed steps in any operational method. First, the device detect module 27 is designed to search for new devices (Action A1) and thus discover the unmanaged device 400. Once the presence of the unmanaged device 400 is detected, the device detect module 27 sends a notification of the discovery of the device (Action A2) and stores the relevant information in the storage unit 10, thereby the unmanaged device 400 becomes a managed device 300. At the same time, the automatic account management system 100 retrieves commonly used account/credential combinations from the account credential dictionary 25 (Action A3) and sends a notification of the newly added device (Action A4) to inform the account detect module 26.

When necessary, the credential modification module 22 retrieves credentials from the storage unit 10 (Action A5), makes changes to them, and then stores them back in the storage unit 10 (Action A8). After changes are made to the credentials, the credential modification module 22 notifies the modified credential process module 28 for further processing (Action A14). As mentioned earlier, the modified credential process module 28 primarily uses two methods to handle the modified credentials to ensure their availability. One method is to split the credentials and store them in different locations (Action A15), and the other method is to update them to another device based on a predefined triggering rule (Action A16). Furthermore, the remote login module 23 retrieves the desired account/credential combination from the storage unit 10 (Action A11) to log into the managed device 300 (Action A12). Alternatively, it can also display the modified credentials for manual input by the user into the managed device 300 (Action A13).

In addition, the automatic account management system 100 will, under appropriate circumstances, notify the account detect module 26 to search for new accounts on the managed device 300 (Action A9). It will also notify the account verification module 24 of accounts that require verification (Action A6). If the account verification module 24 discovers new accounts, it will include the newly added accounts in the management process and hand them over to the credential modification module 22 for processing (Action A7). If the account verification module 24 identifies accounts that have been deleted or disabled, it will deactivate or delete them in the automatic account management system 100 (Action A10).

The automatic account management system 100 provided in the present invention carries out the various actions described above through its modules to manage accounts on the managed devices 300 within the network environment N. As described above, it can be understood that the automatic account management system 100 provided in the present invention can operate automatically to a large extent, eliminating the hassle of complex operations and offering a cost-effective solution suitable for various scenarios. Additionally, it ensures the availability of credentials after modifications have been made.

It should be realized that the above description is only some preferred embodiments of the present invention and should not be deemed as limitations of implementing the present invention. All substantially equivalent variations and modifications which employ the concepts disclosed in this specification and the appended claims should fall within the scope of the present invention.

What is claimed is:

1. An automatic account management system applied in a network environment, wherein the network environment comprises a plurality of devices, and the devices comprise a managed device; the managed device is adapted to be logged in using multiple accounts, each of which is accompanied by a credential for logging into the managed device; among these accounts, there is a privileged account that, when used to log in to the managed device, allows one to edit, create, or delete accounts and their respective credentials;

the managed device is configured to be logged into by an authorized individual; the automatic account management system comprising:

a storage unit storing a personnel information and a device information, wherein the personnel information corresponds to the authorized person, and comprises an identification name and contact details of the authorized person; the device information corresponds to the managed device, and comprises the accounts and the credentials which are capable of logging in the managed device; the storage unit also stores an authorization relationship between the authorized person and the managed device; and a processing unit linked to the storage unit in an information-exchangeable manner, wherein the processing unit comprises:

a credential modification module adapted to use a credential modification algorithm to modify at least one of the credentials in the device information stored in the storage unit, and to update, automatically and without human intervention, the at least one of the credentials, which has been modified, to the storage unit;

a remote login module adapted to use the accounts and the credentials contained in the device information stored in the storage unit to log in to the managed device, wherein, after the credential modification module operates, the remote login module uses the privileged account to log in to the managed device for updating the at least one of the credentials which has been modified to the managed device; and an account verification module adapted to, based on the authorization relationship stored in the storage unit and the identification name and the contact details contained in the personnel information, contact the authorized person for verifying validities of the accounts contained in the device information through an electronic process; and an account detect module adapted to, when the remote login module logs in to the managed device with the privileged account, detect whether another account has been added into the managed device or whether one of the accounts has been deleted, and, if so, notify the account verification module to verify the validities of the accounts contained in the device information;

wherein the account verification module is further adapted to, in response to the notification from the account detect module, identify a newly added account associated with the managed device and incorporate the newly added account into the device information stored in the storage unit; and wherein the credential modification module is further adapted to automatically generate a new credential corresponding to the newly added account and to store the new credential in the storage unit.

2. The automatic account management system of claim 1, wherein, if the account verification module of the processing unit finds out one of the accounts has lost its validity, the processing unit modifies the corresponding one of the credentials by using the credential modification module, and updates the modified one of the credentials to the storage unit; the processing unit also uses the remote login module to log in to the managed device with the privileged account, updating the modified one of the credentials to the managed device.

3. The automatic account management system of claim 1, wherein, if the account verification module of the processing unit finds out one of the accounts has lost its validity, the processing unit deletes or disables the account which has lost its validity and the corresponding one of the credentials from the device information of the storage unit.

4. The automatic account management system of claim 3, wherein the account which has lost its validity is deleted or disabled by using the remote login module to log in to the managed device with the privileged account.

5. The automatic account management system of claim 1, wherein the device information stored in the storage unit also comprises a basic data of the managed device; the processing unit further comprises a device detect module, wherein the devices comprises an unmanaged device; the device detect module actively looks for the unmanaged device among the devices in the network environment through a device detecting method; if the device detect module finds the unmanaged device, the processing unit adds another device information into the storage unit, writing the basic data of the unmanaged device into the another device information, and the unmanaged device becomes another managed device;

wherein, in response to the unmanaged device becoming the another managed device, the credential modification module is further adapted to automatically retrieve at least one credential from the storage unit, modify the at least one credential, and store the modified credential back into the storage unit.

6. The automatic account management system of claim 5, wherein the remote login module of the processing unit further refers to an account credential dictionary to try to log in to the devices; if a privileged account which is capable of logging in to the unmanaged device is found, the privileged account and the corresponding one of the credentials are written into the another device information stored in the storage unit.

7. The automatic account management system of claim 6, wherein the account credential dictionary is created manually, created by referring to the accounts and the credentials in the device information stored in the storage unit, or created by searching or intercepting the managed device.

8. The automatic account management system of claim 1, wherein the processing unit further comprises a modified credential process module; when the credential modification module modifies one of the credentials, the modified credential process module splits the modified one of the credentials to be kept in different locations.

9. The automatic account management system of claim 1, wherein the network environment further comprises another managed device, and the processing unit further comprises a modified credential process module; when the credential modification module modifies one of the credentials, the modified credential process module correspondingly updates the modified one of the credentials to the another managed device through the remote login module by following a predetermined triggering rule.

* * * * *